(12) United States Patent
Hattori et al.

(10) Patent No.: US 10,663,011 B2
(45) Date of Patent: May 26, 2020

(54) SPEED CHANGE DEVICE

(71) Applicant: AISIN AW CO., LTD., Anjo-shi, Aichi-Ken (JP)

(72) Inventors: Nakatsune Hattori, Chiryu (JP); Takeshi Torii, Chiryu (JP)

(73) Assignee: AISIN AW CO., LTD., Anjo (JP)

( * ) Notice: Subject to any disclaimer, the term of this patent is extended or adjusted under 35 U.S.C. 154(b) by 81 days.

(21) Appl. No.: 15/557,282

(22) PCT Filed: Mar. 28, 2016

(86) PCT No.: PCT/JP2016/059990
§ 371 (c)(1),
(2) Date: Sep. 11, 2017

(87) PCT Pub. No.: WO2016/158887
PCT Pub. Date: Oct. 6, 2016

(65) Prior Publication Data
US 2018/0058511 A1    Mar. 1, 2018

(30) Foreign Application Priority Data

Mar. 31, 2015 (JP) ................................ 2015-074340

(51) Int. Cl.
*F16D 13/60* (2006.01)
*F16D 25/12* (2006.01)
(Continued)

(52) U.S. Cl.
CPC ......... *F16D 13/60* (2013.01); *F16D 25/0638* (2013.01); *F16D 25/12* (2013.01); *F16D 25/123* (2013.01); *F16H 57/0436* (2013.01)

(58) Field of Classification Search
CPC ...... F16D 13/60; F16D 25/0638; F16D 25/12; F16D 25/123; F16D 13/72; F16H 57/0436
See application file for complete search history.

(56) References Cited

U.S. PATENT DOCUMENTS 6,585,096 B2 * 7/2003 Fujita ..................... F16D 13/64
192/107 R
6,945,371 B2 * 9/2005 Schmidt .............. F16D 25/0638
188/264 E (Continued)

FOREIGN PATENT DOCUMENTS

JP    H05-141446 A    6/1993
JP    H05-231446 A    9/1993

(Continued)

OTHER PUBLICATIONS

Jun. 14, 2016 International Search Report issued in International Patent Application No. PCT/JP2016/059990.

*Primary Examiner* — David R Morris
(74) *Attorney, Agent, or Firm* — Oliff PLC

(57) ABSTRACT

A speed change device where the plurality of oil holes have a plurality of first oil holes that are closest to the piston in the axial direction and that are disposed side by side in a circumferential direction, and a plurality of different oil holes that are farther from the piston than the plurality of first oil holes in the axial direction, the plurality of oil holes enabling the working oil to be supplied to spaces between the plurality of inner friction plates and the outer friction plates; and a number of the plurality of different oil holes is smaller than a number of the plurality of first oil holes, the plurality of different oil holes being disposed side by side in the circumferential direction at a position that is farther from the piston than the plurality of first oil holes in the axial direction.

10 Claims, 7 Drawing Sheets

(51) Int. Cl.
*F16D 25/0638* (2006.01)
*F16H 57/04* (2010.01)

(56) References Cited

U.S. PATENT DOCUMENTS

| | | | | |
|---|---|---|---|---|
| 6,976,567 | B2* | 12/2005 | Kitabayashi | F16D 25/0638 192/113.34 |
| 7,350,631 | B2* | 4/2008 | Furuichi | F16D 13/683 192/30 W |
| 7,383,932 | B2* | 6/2008 | Miyazaki | F16D 13/683 192/70.12 |
| 7,566,287 | B2* | 7/2009 | Onishi | F16D 25/0638 192/30 W |
| 8,607,952 | B2* | 12/2013 | Keating | F16D 13/683 192/112 |
| 8,636,129 | B2* | 1/2014 | Keating | F16D 13/683 192/112 |
| 8,881,880 | B2* | 11/2014 | Seo | F16D 25/12 192/106 F |
| 9,046,139 | B2* | 6/2015 | Meyer | F16D 13/72 |
| 9,212,701 | B2* | 12/2015 | Dziurda | F16D 1/02 |
| 9,784,364 | B2* | 10/2017 | Hattori | F16H 57/082 |
| 9,810,313 | B2* | 11/2017 | Ike | F16H 57/10 |
| 9,841,098 | B2* | 12/2017 | Deutsch | F16D 13/52 |
| 9,958,056 | B2* | 5/2018 | Torii | F16H 57/10 |
| 10,138,949 | B2* | 11/2018 | Hattori | F16D 25/0638 |
| 10,295,002 | B2* | 5/2019 | Hill | F16D 13/683 |
| 2002/0043441 | A1* | 4/2002 | Fujita | F16D 13/64 192/85.43 |
| 2004/0074708 | A1* | 4/2004 | Schmidt | F16D 25/0638 188/71.5 |
| 2005/0029072 | A1* | 2/2005 | Kitabayashi | F16D 25/0638 192/70.12 |
| 2006/0049017 | A1* | 3/2006 | Furuichi | F16D 13/683 192/30 W |
| 2006/0054448 | A1* | 3/2006 | Miyazaki | F16D 13/683 192/113.34 |
| 2006/0113157 | A1* | 6/2006 | Ichikawa | F16D 25/123 192/113.34 |
| 2007/0161450 | A1* | 7/2007 | Onishi | F16D 25/0638 475/146 |
| 2011/0203897 | A1* | 8/2011 | Keating | F16D 13/683 192/112 |
| 2011/0315505 | A1* | 12/2011 | Keating | F16D 13/683 192/112 |
| 2013/0075217 | A1* | 3/2013 | Seo | F16D 25/0638 192/48.601 |
| 2013/0153355 | A1* | 6/2013 | Kummer | F16D 25/0638 192/48.1 |
| 2013/0174407 | A1* | 7/2013 | Dziurda | F16D 1/02 29/525.01 |
| 2014/0174876 | A1* | 6/2014 | Meyer | F16D 25/123 192/70.12 |
| 2015/0362063 | A1* | 12/2015 | Torii | F16H 57/10 74/411.5 |
| 2015/0369356 | A1* | 12/2015 | Ike | F16H 57/10 475/220 |
| 2016/0215830 | A1* | 7/2016 | Hattori | F16D 25/0638 |
| 2016/0290492 | A1* | 10/2016 | Hattori | F16H 57/082 |
| 2017/0051800 | A1* | 2/2017 | Hill | F16D 13/683 |
| 2017/0074331 | A1* | 3/2017 | Fisher | F16D 13/683 |
| 2017/0089452 | A1* | 3/2017 | Deutsch | F16D 13/52 |

FOREIGN PATENT DOCUMENTS

| | | |
|---|---|---|
| JP | 2004-125098 A | 4/2004 |
| JP | 2005-133794 A | 5/2005 |

* cited by examiner

FIG.2

|   |      | C-1 | C-2 | C-3 | C-4 | B-1 | B-2 | F-1 |
|---|------|-----|-----|-----|-----|-----|-----|-----|
| D | 1st  | ○   |     |     |     |     | ●   | ○   |
|   | 2nd  | ○   |     |     |     | ○   |     |     |
|   | 3rd  | ○   |     | ○   |     |     |     |     |
|   | 4th  | ○   |     |     | ○   |     |     |     |
|   | 5th  | ○   | ○   |     |     |     |     |     |
|   | 6th  |     | ○   |     | ○   |     |     |     |
|   | 7th  |     | ○   | ○   |     |     |     |     |
|   | 8th  |     | ○   |     |     | ○   |     |     |
| REV1 |   |     |     | ○   |     |     | ○   |     |
| REV2 |   |     |     |     | ○   |     | ○   |     |

※○: ENGAGED

●: ENGAGED WITH ENGINE BRAKE IN OPERATION

SPEED CHANGE DEVICE

BACKGROUND

The present disclosure relates to a speed change device.

A speed change device that includes a multi-plate friction-type hydraulic clutch is known. The multi-plate friction-type hydraulic clutch has, for example: a plurality of friction plates fitted with splines of a clutch hub so as to be movable in the axial direction; a plurality of separator plates fitted with splines of a clutch drum so as to be movable in the axial direction; and a piston capable of pressing and releasing the friction plates and the separator plates, which are disposed alternately, in the axial direction.

When the piston presses the friction plates and the separator plates, which are disposed alternately, in the axial direction, the friction plates and the separator plates contact each other. That is, the friction plates and the separator plates are frictionally engaged with each other so that rotary elements coupled to the clutch hub and the clutch drum are rotatable together with each other.

When the piston is moved away from the friction plates and the separator plates, which are disposed alternately, on the other hand, the friction plates and the separator plates are released. When the friction plates and the separator plates which have been released are moved away from each other, the rotary elements which are coupled to the clutch hub and the clutch drum rotate relative to each other (idle).

In order to supply lubricating oil that has been supplied into the clutch hub evenly to the friction plates and the separator plates, in addition, oil feed holes formed in oil feed grooves (tooth root portions) of the splines of the clutch hub are formed such that the number of oil feed holes on the clutch piston side is larger than the number of oil feed holes on the end plate side. This prevents occurrence of seizure, accompanying rotation, and poor disengagement due to poor lubrication.

SUMMARY

In the hub according to Japanese Patent Application Publication No. 5-141446, oil feed holes are provided evenly from the clutch piston side to the end plate side, and the amount of oil supplied from the oil feed holes is even from the clutch piston side to the end plate side. Therefore, with the hub, in the case where the clutch is to be disengaged, it is difficult to quickly separate the separator plate and the friction plate that are the closest to the clutch piston from the other separator plates and friction plates immediately after the clutch piston is returned by a spring. That is, with such a hub, spaces (pack) between the separator plates and the friction plates cannot be released (a pack clearance cannot be secured), which leads to a drag loss. This hinders improving the efficiency of the speed change device, and makes it difficult to improve the fuel efficiency.

Japanese Patent Application Publication No. 2004-125098 describes a hub in which the number of oil feed holes is varied from the clutch piston side to the end plate side so that the number of oil feed holes on the piston side is larger than that of oil feed holes on the backing plate side. With the hub, however, the separator plate and the friction plate that are the closest to the clutch piston cannot be quickly separated from the other separator plates and friction plates. Therefore, a pack clearance cannot be secured, and the efficiency (fuel efficiency) cannot be improved sufficiently.

A speed change device according to an exemplary aspect of the present disclosure including a clutch hub, a clutch drum, a plurality of inner friction plates, a plurality of outer friction plates, and a piston. The clutch hub has a first outer peripheral surface provided with first splines that extend in an axial direction and a first inner peripheral surface that is positioned on an opposite side of the first outer peripheral surface and that faces a supply portion for working oil. The clutch hub is provided with a plurality of oil holes that connect between the first inner peripheral surface and the first outer peripheral surface. The clutch drum houses at least a part of the clutch hub such that the clutch drum is rotatable with respect to the clutch hub, and has a second inner peripheral surface provided with second splines that extend in the axial direction. The inner friction plates are spline-fitted with the first splines. The outer friction plates are spline-fitted with the second splines, and disposed alternately with the plurality of inner friction plates in the axial direction. The piston presses the plurality of inner friction plates and the outer friction plates. The plurality of oil holes have a plurality of first oil holes that are the closest to the piston in the axial direction and that are disposed side by side in a circumferential direction, and a plurality of different oil holes that are farther from the piston than the plurality of first oil holes in the axial direction. The plurality of oil holes enable the working oil to be supplied to spaces between the plurality of inner friction plates and the outer friction plates. The number of the plurality of different oil holes is smaller than the number of the plurality of first oil holes, the plurality of different oil holes being disposed side by side in the circumferential direction at a position that is farther from the piston than the plurality of first oil holes in the axial direction.

According to the present disclosure, much working oil is supplied from the first oil holes when operation to return the piston in order to disengage a clutch is started. Therefore, working oil can be supplied to a space between the outer friction plate or the inner friction plate that is the closest to the piston and the outer friction plate or the inner friction plate which is adjacent thereto. This allows the outer friction plate and the inner friction plate to be moved away from each other quickly. That is, when releasing the outer friction plate and the inner friction plate from an engaged state, the largest amount of lubricating oil can be supplied to the outer friction plate and the inner friction plate that are the closest to the piston, which allows the outer friction plate and the inner friction plate that are the closest to the piston to be separated from the other outer friction plates and inner friction plates to release pack. Thus, a drag loss can be reduced, and the efficiency (fuel efficiency) of the speed change device can be improved.

BRIEF DESCRIPTION OF THE DRAWINGS

FIG. 2 is an operation table illustrating the relationship between each shift speed of an automatic transmission according to the embodiment and the respective operating states of clutches, brakes, and a one-way clutch.

DETAILED DESCRIPTION OF EMBODIMENTS

An embodiment will be described below with reference to FIGS. 1 to 7. A plurality of expressions are occasionally used for constituent elements according to the embodiment or descriptions of such elements. Use of other expressions that are not used for such constituent elements and descriptions is not hindered. Furthermore, use of other expressions for constituent elements and descriptions, for which a plurality of expressions are not used, is not hindered.

Figure 1:
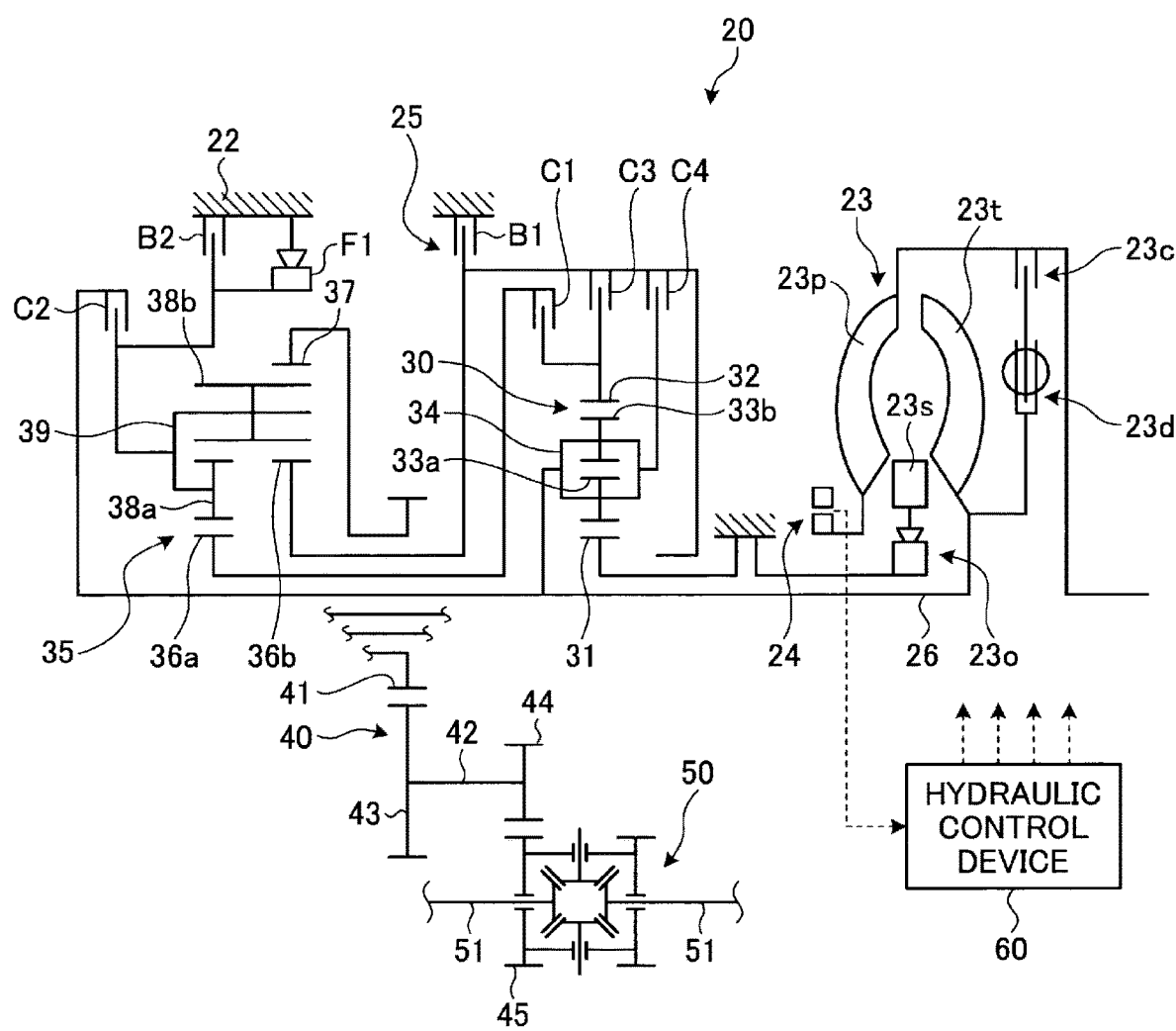
FIG. 1 schematically illustrates a power transfer device according to an embodiment.

FIG. 1 schematically illustrates a power transfer device 20 that includes an automatic transmission (speed change device) 25 according to an embodiment. The power transfer device 20 illustrated in FIG. 1 is connected to a crankshaft of an engine mounted on a front-wheel drive vehicle, and can transfer power from the engine to left and right drive wheels (front wheels). The power transfer device 20 is not limited thereto.

As illustrated in FIG. 1, the power transfer device 20 has a transmission case 22 made of an aluminum alloy, for example, a starting device (fluid transmission apparatus) 23 housed inside the transmission case 22, an oil pump 24, the automatic transmission 25, a gear mechanism (gear train) 40, a differential gear (differential mechanism) 50, and a hydraulic control device 60 attached to the transmission case 22.

The starting device 23 is a torque converter that has a pump impeller 23$p$ on the input side, a turbine runner 23$t$ on the output side, a stator 23$s$, a one-way clutch 23$o$, a lock-up clutch 23$c$, and a damper 23$d$. It should be noted, however, that the starting device 23 may be a fluid coupling that does not have the stator 23$s$.

The pump impeller 23$p$ is connected to a crankshaft of the engine. The turbine runner 23$t$ is connected to an input shaft (input member) 26 of the automatic transmission 25. The stator 23$s$ is disposed on the inner side of the pump impeller 23$p$ and the turbine runner 23$t$, and adjusts a flow of working oil from the turbine runner 23$t$ to the pump impeller 23$p$. The one-way clutch 23$o$ restricts the rotational direction of the stator 23$s$ to one direction.

The oil pump 24 is a gear pump that has a pump assembly, an externally toothed gear, and an internally toothed gear. The pump assembly has a pump body and a pump cover. The externally toothed gear is connected to the pump impeller 23$p$ of the starting device 23 via a hub. The internally toothed gear is meshed with the externally toothed gear. The oil pump 24 is driven by power from the engine to suction working oil (ATF) stored in an oil pan and pump the working oil to the hydraulic control device 60. The hydraulic control device 60 generates a hydraulic pressure required by the starting device 23 or the automatic transmission 25.

The automatic transmission 25 is constituted as an eight-speed transmission. The automatic transmission 25 has the input shaft 26 described above, a double-pinion type first planetary gear mechanism 30, a Ravigneaux type second planetary gear mechanism 35, and four clutches C1, C2, C3, C4, two brakes B1, B2, and a one-way clutch F1 that change a power transfer path from the input side to the output side.

The first planetary gear mechanism 30 of the automatic transmission 25 has a sun gear 31, a ring gear 32, two pinion gears 33$a$, 33$b$, and a planetary carrier 34. The sun gear 31 is an externally toothed gear. The ring gear 32 is an internally toothed gear disposed concentrically with the sun gear 31. The pinion gears 33$a$, 33$b$ are meshed with each other. One of the pinion gears 33$a$, 33$b$ is meshed with the sun gear 31, and the other is meshed with the ring gear 32. The planetary carrier 34 holds a plurality of sets of two pinion gears 33$a$, 33$b$ so as to be rotatable and revolvable.

The sun gear 31 of the first planetary gear mechanism 30 is fixed to the transmission case 22. The planetary carrier 34 of the first planetary gear mechanism 30 is coupled so as to be rotatable together with the input shaft 26. The first planetary gear mechanism 30 is constituted as a so-called speed reduction gear, and reduces the speed of power transferred to the planetary carrier 34 which serves as an input element to output the power from the ring gear 32 which serves as an output element.

The second planetary gear mechanism 35 of the automatic transmission 25 has a first sun gear 36$a$, a second sun gear 36$b$, a ring gear 37, a plurality of short pinion gears 38$a$, a plurality of long pinion gears 38$b$, and a planetary carrier 39. The first sun gear 36$a$ and the second sun gear 36$b$ are each an externally toothed gear. The ring gear 37 is an internally toothed gear disposed concentrically with the first and second sun gears 36$a$, 36$b$. The short pinion gears 38$a$ are meshed with the first sun gear 36$a$. The long pinion gears 38$b$ are meshed with the second sun gear 36$b$ and the plurality of short pinion gears 38$a$, and meshed with the ring gear 37. The planetary carrier 39 holds the plurality of short pinion gears 38$a$ and the plurality of long pinion gears 38$b$ so as to be rotatable and revolvable.

The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 51. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo including a piston, a plurality of friction plates, a plurality of separator plates, and an oil chamber to which working oil is supplied. The clutch C1 can connect the ring gear 32 of the first planetary gear mechanism 30 and the first sun gear 36$a$ of the second planetary gear mechanism 35 to each other, and disconnect the ring gear 32 and the first sun gear 36$a$ from each other.

The clutch C2 is a multi-plate friction-type hydraulic clutch that has a hydraulic servo including a piston, a plurality of friction plates, a plurality of separator plates, and an oil chamber to which working oil is supplied. The clutch C2 can connect the input shaft 26 and the planetary carrier 39 of the second planetary gear mechanism 35 to each other, and disconnect the input shaft 26 and the planetary carrier 39 from each other.

The clutch C3 is a multi-plate friction-type hydraulic clutch that has a hydraulic servo including a piston, a plurality of friction plates, a plurality of separator plates, and an oil chamber to which working oil is supplied. The clutch C3 can connect the ring gear 32 of the first planetary gear mechanism 30 and the second sun gear 36$b$ of the second planetary gear mechanism 35 to each other, and disconnect the ring gear 32 and the second sun gear 36$b$ from each other.

The clutch C4 is a multi-plate friction-type hydraulic clutch that has a hydraulic servo including a piston, a plurality of friction plates, a plurality of separator plates, and an oil chamber to which working oil is supplied. The clutch C4 can connect the planetary carrier 34 of the first planetary gear mechanism 30 and the second sun gear 36b of the second planetary gear mechanism 35 to each other, and disconnect the planetary carrier 34 and the second sun gear 36b from each other.

The brake B1 is a multi-plate friction-type hydraulic brake that has a hydraulic servo including a plurality of friction plates, a plurality of separator plates, and an oil chamber to which working oil is supplied. The brake B1 can make the second sun gear 36b of the second planetary gear mechanism 35 stationary with respect to the transmission case 22, and make the second sun gear 36b non-stationary with respect to the transmission case 22.

The brake B2 is a multi-plate friction-type hydraulic brake that has a hydraulic servo including a plurality of friction plates, a plurality of separator plates, and an oil chamber to which working oil is supplied. The brake B2 can make the planetary carrier 39 of the second planetary gear mechanism 35 stationary with respect to the transmission case 22, and make the planetary carrier 39 non-stationary with respect to the transmission case 22.

The one-way clutch F1 has an inner race coupled (fixed) to the planetary carrier 39 of the second planetary gear mechanism 35, an outer race, a plurality of sprags, a plurality of springs (plate springs), and a cage. The one-way clutch F1 transfers torque via the sprags when the outer race is rotated in one direction with respect to the inner race, and allows the inner race and the outer race to rotate relative to each other when the outer race is rotated in the other direction with respect to the inner race. It should be noted, however, that the one-way clutch F1 may be of a roller type or the like, rather than the sprag type.

The clutches C1 to C4 and the brakes B1, B2 operate with working oil supplied thereto and discharged therefrom by the hydraulic control device 60 described above. FIG. 2 is an operation table illustrating the relationship between each shift speed of the automatic transmission 25 according to the embodiment and the respective operating states of the clutches C1 to C4, the brakes B1, B2, and the one-way clutch F1.

The automatic transmission 25 provides first to eighth forward speeds and first and second reverse speeds when the clutches C1 to C4 and the brakes B1, B2 are brought into the respective states illustrated in the operation table of FIG. 2. At least one of the clutches C1 to C4 and the brake B2, which does not include the brake B1, may be a meshing engagement element such as a dog clutch.

As illustrated in FIG. 1, the gear mechanism 40 has a counter drive gear 41, a counter shaft 42, a counter driven gear 43, a drive pinion gear (final drive gear) 44, and a differential ring gear (final driven gear) 45.

The counter drive gear 41 is coupled to the ring gear 37 of the second planetary gear mechanism 35 of the automatic transmission 25. The counter shaft 42 extends in parallel with the input shaft 26 of the automatic transmission 25. The counter driven gear 43 is fixed to the counter shaft 42, and meshed with the counter drive gear 41. The drive pinion gear 44 is shaped integrally with (or fixed to) the counter shaft 42 so as to be spaced away from the counter driven gear 43 in the axial direction. The differential ring gear 45 is meshed with the drive pinion gear 44, and coupled to the differential gear 50.

Figure 3:
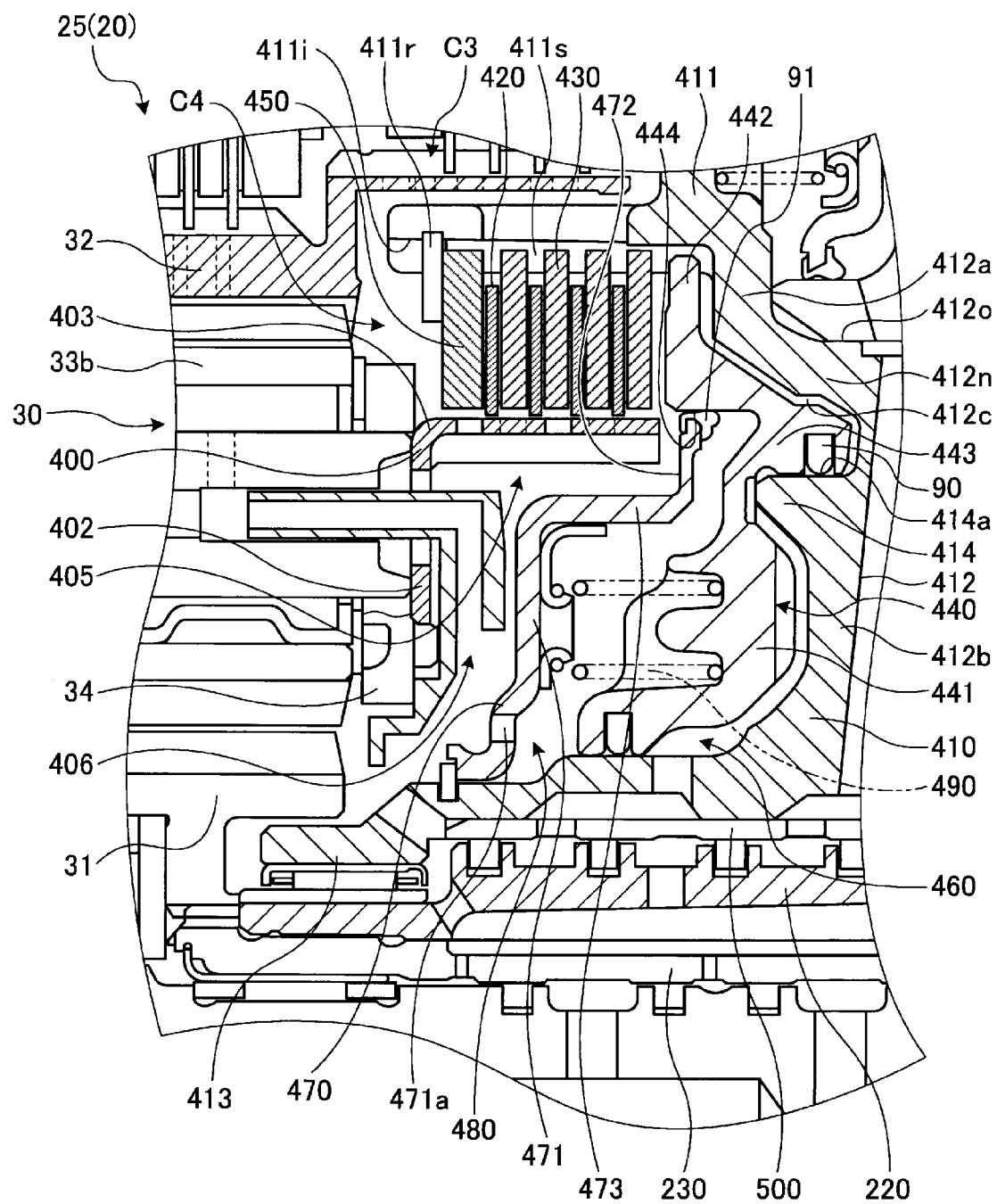
FIG. 3 is a sectional view illustrating a part of the automatic transmission according to the embodiment.

FIG. 3 is a sectional view illustrating a part of the automatic transmission 25 of the power transfer device 20 according to the embodiment. FIG. 3 illustrates components around the clutch C4 which is included in the automatic transmission 25 of the power transfer device 20. As illustrated in FIG. 3, the clutch C3 which fastens the ring gear 32 of the first planetary gear mechanism 30 and the second sun gear 36b of the second planetary gear mechanism 35 to each other is disposed around the clutch C4 which fastens the planetary carrier 34 of the first planetary gear mechanism 30 and the second sun gear 36b of the second planetary gear mechanism 35 to each other.

A clutch hub of the clutch C3 is integrated with (coupled to) the ring gear 32 of the first planetary gear mechanism 30 which serves as a power input member, and rotated together with the ring gear 32. A clutch drum of the clutch C3 is coupled to the second sun gear 36b of the second planetary gear mechanism 35 which serves as a power output member (power transfer target) via a coupling member (not illustrated), and rotated together with the second sun gear 36b.

The clutch C4 has a clutch hub 400, a clutch drum 410, a plurality of friction plates (inner friction plates) 420, a plurality of separator plates (outer friction plates) 430, and a piston 440. The inner peripheral portions of the friction plates 420 are fitted with the clutch hub 400. The outer peripheral portions of the separator plates 430 are fitted with the clutch drum 410. The piston 440 presses the friction plates 420 and the separator plates 430 in the axial direction of the power transfer device 20 to frictionally engage the friction plates 420 and the separator plates 430 with each other.

The clutch hub 400 is integrated with (coupled to) the planetary carrier 34 of the first planetary gear mechanism 30 which serves as a power input member, and rotated together with the planetary carrier 34. The clutch drum 410 is coupled (fixed) to the second sun gear 36b of the second planetary gear mechanism 35 which serves as a power output member (power transfer target), and rotated together with the second sun gear 36b.

The friction plates 420 which are fitted with the clutch hub 400 are each an annular member, to both surfaces of which a friction material is affixed. The separator plates 430 which are fitted with the clutch drum 410 are each an annular member, both surfaces of which are formed to be smooth.

The clutch drum 410 of the clutch C4 has an outer tubular portion 411 in a generally cylindrical shape, an annular wall portion 412 in a generally disc-like shape, and an inner tubular portion 413 in a generally cylindrical shape. The outer tubular portion 411 extends in the axial direction of the clutch drum 410 (automatic transmission 25). Furthermore, the outer tubular portion 411 is engaged with (fixed to) the clutch drum of the clutch C3, and coupled to the second sun gear 36b of the second planetary gear mechanism 35 via the clutch drum of the clutch C3 and the coupling member. The annular wall portion 412 extends inward from one end of the outer tubular portion 411. The inner tubular portion 413 extends in the same direction (coaxially with) the outer tubular portion 411 from the inner peripheral portion of the annular wall portion 412 so as to be positioned on the inner side of the outer tubular portion 411, and extends in the axial direction of the clutch drum 410. The outer tubular portion 411, the annular wall portion 412, and the inner tubular portion 413 are shaped integrally by casting an aluminum alloy or the like, for example. The annular wall portion 412 extends radially inward between the base end of the outer tubular portion 411 and the base end of the inner tubular portion 413.

A sleeve 500 made of iron is fitted (press-fitted) into the inner tubular portion 413 of the clutch drum 410. A tubular portion 220 of an annular front support is fitted into the sleeve 500. The front support is fixed to the clutch C4 and the transmission case 22 which houses the clutch C4, and forms a part of the transmission case 22. The front support is made of an aluminum alloy, for example.

The inner tubular portion 413 of the clutch drum 410 is rotatably supported by the front support of the transmission case 22. A stator shaft 230 coupled to the stator 23s of the starting device 23 (torque converter) is non-rotatably coupled (fixed) to the tubular portion 220 of the front support via the one-way clutch 23o.

Splines (second splines) 411s are provided on an inner peripheral surface (second inner peripheral surface) 411i of the outer tubular portion 411 of the clutch drum 410. The splines 411s extend in the axial direction of the clutch drum 410 (automatic transmission 25), and are engageable with recessed/projected portions formed on the outer peripheral portions of the separator plates 430.

The plurality of separator plates 430 are spline-fitted (attached) to the splines 411s of the outer tubular portion 411 so as to be movable in the axial direction of the clutch drum 410 (automatic transmission 25). The separator plates 430 are disposed alternately with the plurality of friction plates 420, which are fitted with the clutch hub 400, in the axial direction. In addition, a backing plate (outer friction plate) 450 is fitted with the splines 411s of the outer tubular portion 411 so as to be able to abut against the friction plate 420 that is disposed the closest to the first and second planetary gear mechanisms 30, 35 side (left side in FIG. 3). The backing plate 450 is supported in the axial direction by a snap ring 411r mounted to the outer tubular portion 411.

The annular wall portion 412 of the clutch drum 410 has an outer wall portion 412a and an inner wall portion 412b. The outer wall portion 412a extends toward the inner tubular portion 413 (inward) from the base end of the outer tubular portion 411. The inner wall portion 412b is offset in the direction away from the outer tubular portion 411 with respect to the outer wall portion 412a, is positioned on the engine side with respect to the outer wall portion 412a (opposite side of the free end portion of the clutch drum 410, that is, right side in FIG. 3), and extends between the outer wall portion 412a and the inner tubular portion 413. Consequently, the annular wall portion 412 is formed with a reduced diameter portion 412n that has an outer peripheral surface 412o reduced in diameter compared to the outer peripheral surface of the outer tubular portion 411 and positioned on the opposite side of the outer wall portion 412a from the outer tubular portion 411.

The annular wall portion 412 (inner wall portion 412b) of the clutch drum 410 has an intermediate tubular portion 414 and an annular recessed portion 412c. The intermediate tubular portion 414 is formed to be closer to the inner tubular portion 413 than the outer peripheral surface 412o of the reduced diameter portion 412n, and to extend toward the piston 440 (leftward in FIGS. 3 and 4). The annular recessed portion 412c is formed between the outer peripheral surface 412o of the reduced diameter portion 412n and the intermediate tubular portion 414 in the radial direction to be dented outward (rightward in FIGS. 3 and 4) from the inner surface of the inner wall portion 412b.

The inner tubular portion 413 of the clutch drum 410 is formed to be longer than the outer tubular portion 411. The piston 440 is supported by the outer peripheral surface of the inner tubular portion 413 so as to be movable in the axial direction of the automatic transmission 25.

The piston 440 of the clutch C4 has a pressure receiving portion 441, a pressing portion 442, a cylindrical extended portion 443, and a recessed circular columnar surface 444. The pressure receiving portion 441 is movably supported by the outer peripheral surface of the inner tubular portion 413. The pressing portion 442 extends from the outer peripheral portion of the pressure receiving portion 441 to abut against the separator plate 430 that is positioned the closest to the engine side (right side in FIG. 3). The extended portion 443 extends from the outer peripheral portion of the pressure receiving portion 441 to the opposite side of the pressing portion 442. The recessed circular columnar surface 444 extends to the opposite side of the extended portion 443 on the radially outer side with respect to the inner peripheral surface of the extended portion 443.

Recessed/projected portions that are engageable with the splines 411s of the outer tubular portion 411 of the clutch drum 410 are formed at the outer peripheral portion of the pressing portion 442. Consequently, the piston 440 is also guided by the splines 411s. In addition, the extended portion 443 of the piston 440 is inserted (fitted) into the annular recessed portion 412c which is formed in the annular wall portion 412 of the clutch drum 410. The inner peripheral surface of the extended portion 443 is in sliding contact with an outer peripheral surface 414a of the intermediate tubular portion 414 which prescribes the annular recessed portion 412c.

A seal member such as a D-ring or an O-ring is disposed between the pressure receiving portion 441 of the piston 440 and the outer peripheral surface of the inner tubular portion 413. A seal member 90 such as a D-ring or an O-ring is disposed between the inner peripheral surface of the extended portion 443 of the piston 440 and the outer peripheral surface 414a of the intermediate tubular portion 414. Consequently, an engagement oil chamber 460 supplied with working oil (an engagement hydraulic pressure) for engaging the clutch C4 is formed between the annular wall portion 412 (inner wall portion 412b) of the clutch drum 410 and the back surface of the pressure receiving portion 441 of the piston 440 and on the radially inner side with respect to the outer peripheral surface of the extended portion 443.

The inner tubular portion 413 of the clutch drum 410 supports a cancel plate 470 so as to rotate together with the clutch drum 410. The cancel plate 470 is positioned the first and second planetary gear mechanisms 30, 35 side (left side in FIG. 3) with respect to the piston 440.

The cancel plate 470 has an inner wall portion 471 in a generally disc-like shape, an outer wall portion 472 in a generally disc-like shape, and a connection tubular portion 473. The connection tubular portion 473 extends in the axial direction of the automatic transmission 25 so as to be positioned on the outer side of the inner tubular portion 413 of the clutch drum 410. The inner wall portion 471 extends inward from an end portion of the connection tubular portion 473 the first and second planetary gear mechanisms 30, 35 side (left side in FIG. 3), and covers the pressure receiving portion 441 of the piston 440 from the first and second planetary gear mechanisms 30, 35 side. The outer wall portion 472 extends outward from an end portion of the connection tubular portion 473 on the engine side (right side in FIG. 3). The inner wall portion 471, the outer wall portion 472, and the connection tubular portion 473 are shaped integrally by casting an aluminum alloy or the like, for example.

The inner peripheral portion of the inner wall portion 471 of the cancel plate 470 is supported in the axial direction by a snap ring mounted to the inner tubular portion 413. In addition, a seal member (lip seal) 91 is mounted to the outer peripheral portion of the outer wall portion 472. The seal member 91 is in sliding contact with the recessed circular columnar surface 444 which is formed on the piston 440.

Consequently, the cancel plate 470 forms a centrifugal hydraulic pressure cancellation chamber 480 configured to cancel a centrifugal hydraulic pressure generated in the engagement oil chamber 460 together with the piston 440. Furthermore, a plurality of return springs 490 are disposed between the piston 440 and the inner wall portion 471.

Working oil (an engagement hydraulic pressure for the clutch C4) is supplied from the hydraulic control device 60 of FIG. 1 to the engagement oil chamber 460 of the clutch C4. The working oil is supplied to the engagement oil chamber 460 of the clutch C4 through oil paths formed in the tubular portion 220, the sleeve 500, and the inner tubular portion 413.

Furthermore, working oil (cancellation oil, i.e. drain oil) is supplied from the hydraulic control device 60 to the centrifugal hydraulic pressure cancellation chamber 480 of the clutch C4. The working oil is supplied to the centrifugal hydraulic pressure cancellation chamber 480 of the clutch C4 through oil paths formed in the tubular portion 220, the sleeve 500, and the inner tubular portion 413.

An oil hole 471a is provided in the inner wall portion 471 of the cancel plate 470. A part of working oil (cancellation oil) that has flowed into the centrifugal hydraulic pressure cancellation chamber 480 can flow out from the oil hole 471a to be used to lubricate a meshing portion between the sun gear 31 and the pinion gear 33a, a meshing portion between the pinion gear 33b and the pinion gear 33a, and a meshing portion between the pinion gear 33b and the ring gear 32 of the first planetary gear mechanism 30, and so forth.

Figure 4:
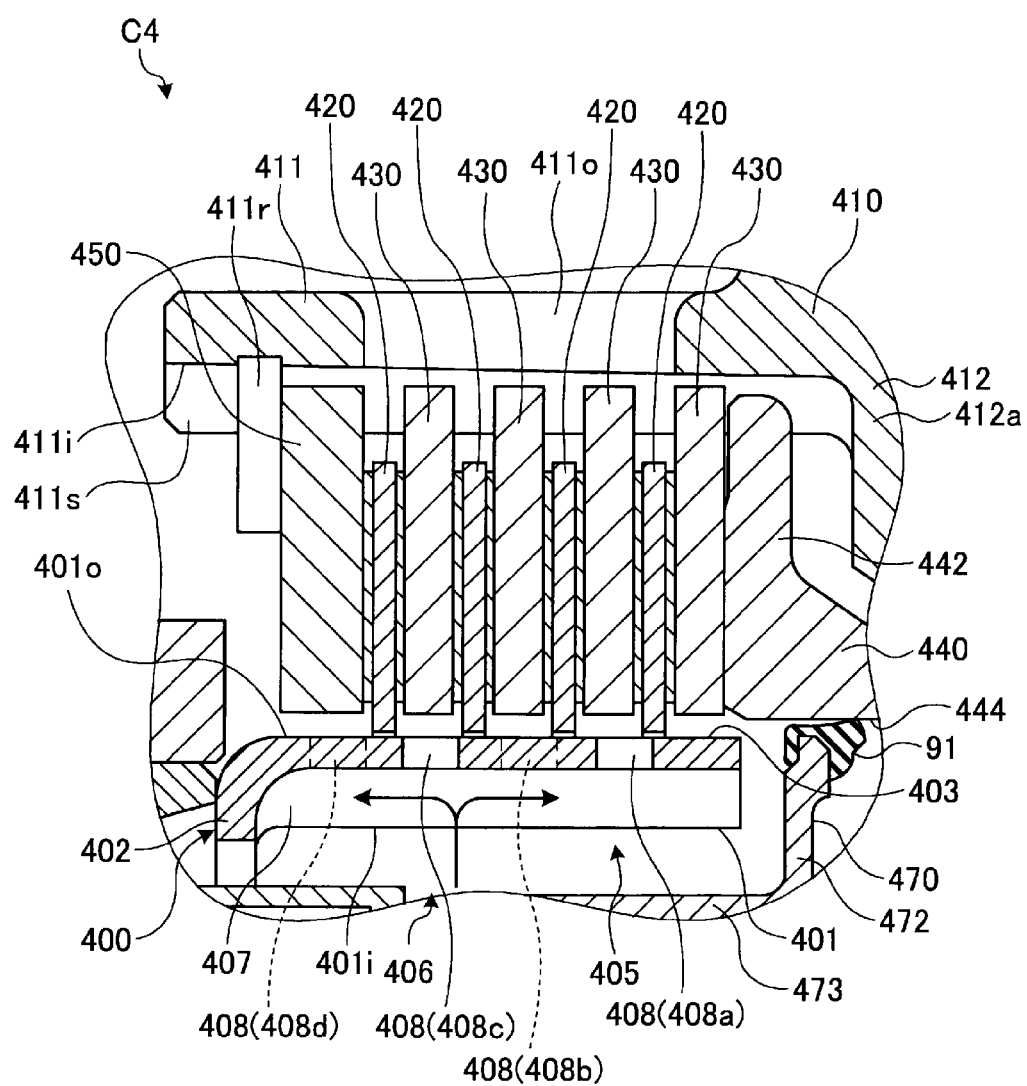
FIG. 4 is a sectional view illustrating the vicinity of a clutch according to the embodiment.

FIG. 4 is a sectional view illustrating the vicinity of the clutch C4, which is a part of the automatic transmission 25 according to the embodiment. As illustrated in FIG. 4, the clutch hub 400 of the clutch C4 is disposed on the inner side of the clutch drum 410 so as to be rotatable with respect to the clutch drum 410. In other words, the clutch hub 400 is housed in the clutch drum 410.

The clutch hub 400 of the clutch C4 has a tubular portion 401 in a generally cylindrical shape and a wall portion 402 in a generally disc-like shape. The tubular portion 401 extends in the axial direction of the clutch hub 400 (automatic transmission 25). The wall portion 402 extends inward from an end portion of the tubular portion 401 on the first and second planetary gear mechanisms 30, 35 side (left side in FIG. 3). The wall portion 402 is coupled to the planetary carrier 34 of the first planetary gear mechanism 30. The tubular portion 401 and the wall portion 402 are shaped integrally by casting an aluminum alloy or the like, for example.

A plurality of splines (first splines) 403 are provided on an outer peripheral surface (first outer peripheral surface) 401o of the tubular portion 401 of the clutch hub 400. The splines 403 extend in the axial direction of the clutch hub 400 (automatic transmission 25), and are engageable with recessed/projected portions formed on the inner peripheral portions of the friction plates 420.

The plurality of friction plates 420 are spline-fitted (attached) to the splines 403 of the tubular portion 401 so as to be movable in the axial direction of the clutch drum 410 (automatic transmission 25). The friction plates 420 are disposed alternately with the plurality of separator plates 430, which are fitted with the clutch drum 410, in the axial direction.

The tubular portion 401 of the clutch hub 400 is positioned on the outer side of the connection tubular portion 473 of the cancel plate 470. Consequently, a cooling oil chamber 405 is formed between the tubular portion 401 of the clutch hub 400 and the connection tubular portion 473 of the cancel plate 470.

As illustrated in FIG. 3, the wall portion 402 of the clutch hub 400 is positioned on the first and second planetary gear mechanisms 30, 35 side (left side in FIG. 3) with respect to the inner wall portion 471 of the cancel plate 470. Consequently, a supply oil path (supply portion for working oil) 406 is formed between the wall portion 402 of the clutch hub 400 and the inner wall portion 471 of the cancel plate 470. The supply oil path 406 is connected to the cooling oil chamber 405.

As illustrated in FIG. 4, the inner peripheral surface (first inner peripheral surface) 401i of the tubular portion 401 of the clutch hub 400, which is positioned on the opposite side of the outer peripheral surface 401o, forms a part of the cooling oil chamber 405. The inner peripheral surface 401i is directed to the supply oil path 406 which is connected to the cooling oil chamber 405.

By providing the clutch hub 400 with the plurality of splines 403, the inner peripheral surface 401i of the tubular portion 401 is provided with a plurality of flow paths (grooves) 407. The flow paths 407 are provided on the opposite side of the splines 403. In other words, the flow paths 407 are provided at positions corresponding to the splines 403. As with the splines 403, the flow paths 407 extend in the axial direction of the clutch hub 400 (automatic transmission 25).

Figure 5:
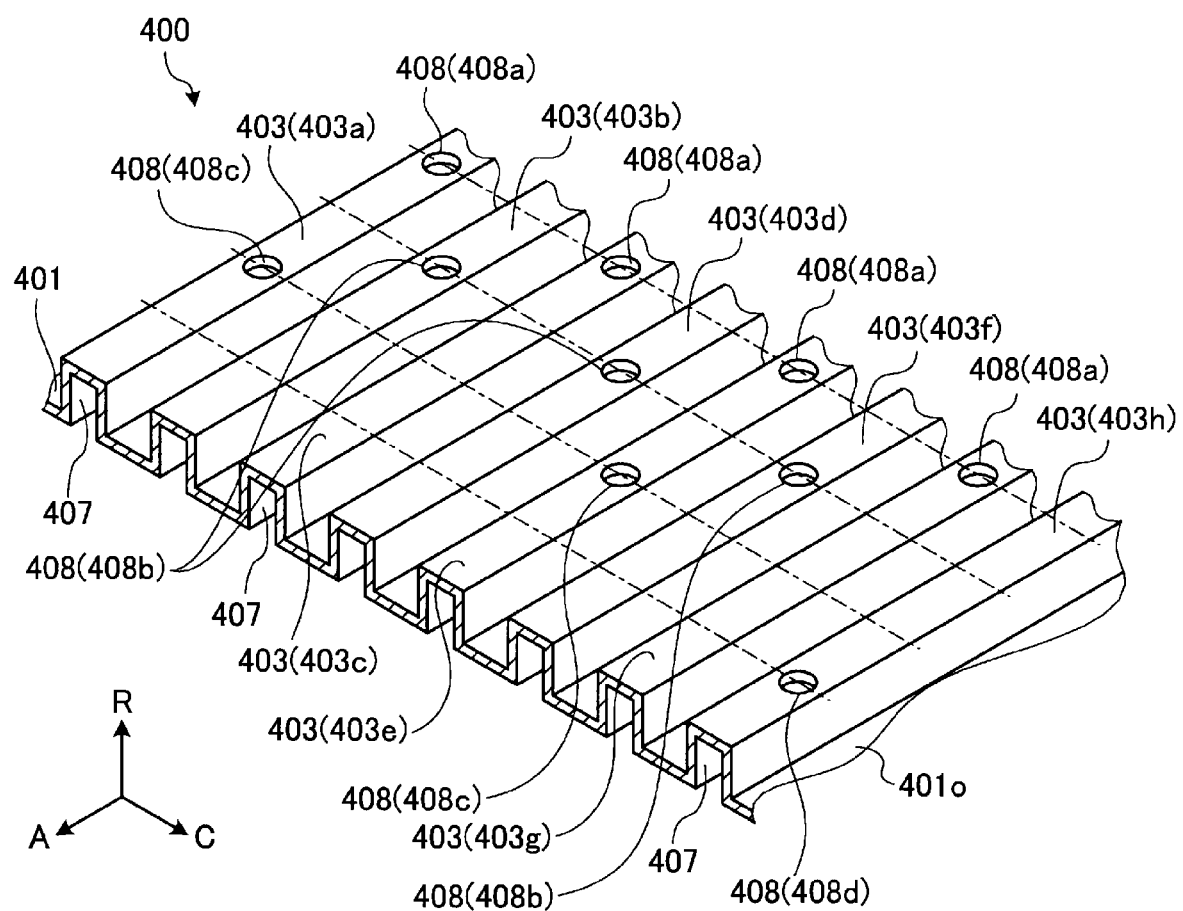
FIG. 5 is a perspective view illustrating a part of a clutch hub according to the embodiment as developed to be flat.

FIG. 5 is a perspective view schematically illustrating a part of the clutch hub 400 according to the embodiment as developed to be flat for the purpose of illustration. A C axis illustrated in FIG. 5 indicates the circumferential direction of the clutch hub 400 (automatic transmission 25). An A axis in FIG. 5 indicates the axial direction of the clutch hub 400. An R axis indicates the radial direction of the clutch hub 400.

As illustrated in FIG. 5, the outer peripheral surface 401o of the tubular portion 401 of the clutch hub 400 forms the bottom surfaces of the splines 403. The plurality of splines 403 project from the outer peripheral surface 401o, and extend in parallel with the axial direction of the clutch hub 400.

The clutch hub 400 is provided with a plurality of supply oil holes (oil holes) 408. The supply oil holes 408 extend in the radial direction of the clutch hub 400, and connect between the top surfaces of the splines 403 which are provided on the outer peripheral surface of the tubular portion 401 and the flow paths 407 which are provided on the inner peripheral surface 401i of the tubular portion 401. That is, the plurality of supply oil holes 408 connect between the inner peripheral surface 401i and the outer peripheral surface 401o of the tubular portion 401.

The splines 403 have a plurality of first splines 403a, a plurality of second splines 403b, a plurality of third splines 403c, a plurality of fourth splines 403d, a plurality of fifth splines 403e, a plurality of sixth splines 403f, a plurality of seventh splines 403g, and a plurality of eighth splines 403h. The splines 403 are disposed side by side in the circumferential direction in the order of one first spline 403a, one second spline 403b, one third spline 403c, one fourth spline 403d, one fifth spline 403e, one sixth spline 403f, one seventh spline 403g, one eighth spline 403h, the next first spline 403a, the next second spline 403b, . . . . The arrangement of the first to eighth splines 403a to 403h is not limited thereto.

Meanwhile, the supply oil holes 408 have a plurality of first supply oil holes (first oil holes) 408a, a plurality of second supply oil holes (third oil holes) 408b, a plurality of third supply oil holes (second oil holes) 408c, and a plurality of fourth supply oil holes 408d.

The plurality of first supply oil holes 408a are provided at a position that is the closest to the piston 440 in the axial direction of the clutch hub 400 (automatic transmission 25). The plurality of third supply oil holes 408c are provided at a position that is farther from the piston 440 than the first supply oil holes 408a and that is closer to the supply oil path 406 than the first supply oil holes 408a in the axial direction of the clutch hub 400.

The plurality of second supply oil holes 408b are provided between the first supply oil holes 408a and the third supply oil holes 408c in the axial direction of the clutch hub 400. That is, the second supply oil holes 408b are provided at a position that is farther from the piston 440 than the first supply oil holes 408a and that is closer to the supply oil path 406 than the first supply oil holes 408a in the axial direction of the clutch hub 400.

The plurality of fourth supply oil holes 408d are positioned the closest to the engine side (left side in FIG. 4) in the axial direction of the clutch hub 400. The fourth supply oil holes 408d are provided at a position that is farther from the piston 440 than the first supply oil holes 408a and that is closer to the supply oil path 406 than the first supply oil holes 408a in the axial direction of the clutch hub 400.

The number of the second supply oil holes 408b is smaller than the number of the first supply oil holes 408a, and larger than the number of the third supply oil holes 408c. In addition, the number of the third supply oil holes 408c is smaller than the number of the second supply oil holes 408b. Furthermore, the number of the fourth supply oil holes 408d is smaller than the number of the third supply oil holes 408c. For example, the clutch hub 400 is provided with 20 first supply oil holes 408a, 15 second supply oil holes 408b, ten third supply oil holes 408c, and five fourth supply oil holes 408d. The respective numbers of the first to fourth supply oil holes 408a to 408d are not limited thereto.

The plurality of first supply oil holes 408a open in the first, third, fifth, and seventh splines 403a, 403c, 403e, 403g. The plurality of first supply oil holes 408a are disposed side by side in the circumferential direction of the clutch hub 400. The plurality of second supply oil holes 408b open in the second, fourth, and sixth splines 403b, 403d, 403f. The plurality of second supply oil holes 408b are disposed side by side in the circumferential direction of the clutch hub 400. The plurality of third supply oil holes 408c open in the first and fifth supply oil holes 403a, 403e. The plurality of third supply oil holes 408c are disposed side by side in the circumferential direction of the clutch hub 400. The plurality of fourth supply oil holes 408d open in the eighth supply oil holes 403h. The plurality of fourth supply oil holes 408d are disposed side by side in the circumferential direction of the clutch hub 400.

As discussed above, the numbers of the other supply oil holes 408 (second supply oil holes 408b, third supply oil holes 408c, and fourth supply oil holes 408d) disposed side by side in the circumferential direction at a position that is farther from the piston 440 than the plurality of first supply oil holes 408a in the axial direction are each smaller than the number of the plurality of the first supply oil holes 408a. In other words, the plurality of supply oil holes 408 form a plurality of rows that each include one or more supply oil holes 408 disposed side by side in the circumferential direction, and the supply oil holes 408 in the rows are disposed side by side in the axial direction. The number of the supply oil holes 408 (first supply oil holes 408a) in a row that is the closest to the piston 440 in the axial direction is larger than each of the numbers of the supply oil holes 408 (second supply oil holes 408b, third supply oil holes 408c, and fourth supply oil holes 408d) in the other rows.

The first supply oil hole 408a which is provided in the third and seventh splines 403c, 403g is provided singly in the axial direction of the clutch hub 400. In other words, the third and seventh splines 403c, 403g are each provided with only one first supply oil hole 408a.

Meanwhile, the first supply oil hole 408a which is provided in the first and fifth splines 403a, 403e is provided side by side with the third supply oil hole 408c in the axial direction of the clutch hub 400. In other words, the first and fifth splines 403a, 403e are each provided with a first supply oil hole 408a and a third supply oil hole 408c.

The second supply oil hole 408b which is provided in the second, fourth, and sixth splines 403b, 403d, 403f is provided singly in the axial direction of the clutch hub 400. In other words, the second, fourth, and sixth splines 403b, 403d, 403f are each provided with only one second supply oil hole 408b.

The fourth supply oil hole 408d which is provided in the eighth splines 403h is provided singly in the axial direction of the clutch hub 400. In other words, the eighth splines 403h are each provided with only one fourth supply oil hole 408d. Furthermore, as illustrated in FIG. 4, the fourth supply oil hole 408d is the farthest from the piston 440 in the axial direction of the power transfer device 20, and faces the inner peripheral end surface of the backing plate 450 which is an outer friction plate that is the farthest from the piston 440. In addition, the fourth supply oil hole 408d is farther from the piston 440 than the friction plate 420 that is the farthest from the piston 440 in the axial direction.

In the clutch C4 configured as described above, when working oil (an engagement hydraulic pressure) for engaging the clutch C4 is supplied to the engagement oil chamber 460 of FIG. 3 by the hydraulic control device 60, the piston 440 is moved toward the friction plates 420 and the separator plates 430.

The pressing portion 442 of the piston 440 which is moved contacts the separator plate 430 that is positioned the closest to the engine side (right side in FIG. 4). The pressing portion 442 presses the separator plate 430 in the axial direction of the automatic transmission 25 toward the first and second planetary gear mechanisms 30, 35 (left side in FIG. 4). The separator plate 430 which is pressed by the pressing portion 442 contacts the friction plate 420 which is adjacent thereto.

The plurality of separator plates 430 and the plurality of friction plates 420 are pressed by the pressing portion 442 of the piston 440 to sequentially contact each other. When all the friction plates 420 and the separator plates 430 contact each other, the friction plate 420 that is positioned the closest to the first and second planetary gear mechanisms 30, 35 side (left side in FIG. 4) contacts the backing plate 450. Consequently, the plurality of friction plates 420 and the plurality of separator plates 430 which contact each other are pressed between the pressing portion 442 of the piston 440 and the backing plate 450.

As described above, when the pressing portion 442 of the piston 440 presses the separator plate 430 that is positioned the closest to the engine side (right side in FIG. 4), the plurality of friction plates 420 and the plurality of separator plates 430 which are disposed alternately contact each other. That is, the piston 440 presses the plurality of friction plates 420 and the plurality of separator plates 430 in the axial direction of the automatic transmission 25 such that the plurality of friction plates 420 and the plurality of separator plates 430 contact each other. Consequently, the friction plates 420 and the separator plates 430 are frictionally engaged with each other.

Meanwhile, when the clutch hub 400 is rotated, working oil is supplied from the supply oil path 406 to the cooling oil chamber 405. As indicated by the arrows in FIG. 4, the working oil flows into the plurality of flow paths 407 which are formed on the inner peripheral surface 401i of the tubular portion 401, and flows along the flow paths 407 which extend in the axial direction of the clutch hub 400.

The supply oil holes 408 which connect between the flow paths 407 and the top surfaces of the splines 403 are covered by the plurality of friction plates 420 and the plurality of separator plates 430 which contact each other. Therefore, working oil in the flow paths 407 is not discharged from the supply oil holes 408 but stored in the flow paths 407. Although a small amount of working oil may flow out from the supply oil holes 408, the amount of working oil supplied to the cooling oil chamber 405 is larger than the amount of working oil flowing out from the supply oil holes 408.

When the friction plates 420 and the separator plates 430 are frictionally engaged with each other, the first supply oil holes 408a, the second supply oil holes 408b, and the third supply oil holes 408c are each positioned between the friction plates 420 which are adjacent to each other in the axial direction, and face the inner peripheral end surfaces of the respective separator plates 430. Meanwhile, as discussed above, the fourth supply oil holes 408d face the inner peripheral end surface of the backing plate 450. The positions of the first to fourth supply oil holes 408a to 408d are not limited thereto.

Figure 6:
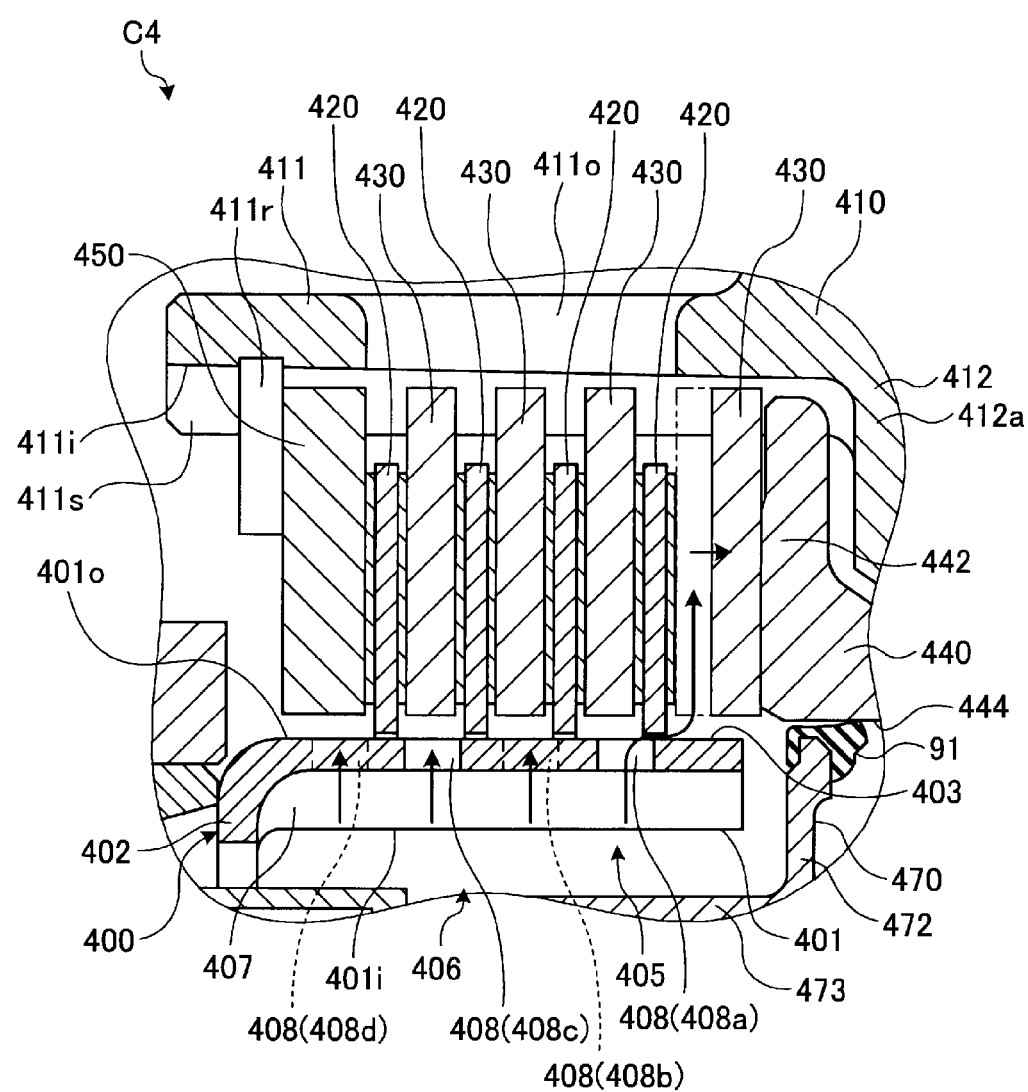
FIG. 6 is a sectional view illustrating the clutch according to the embodiment immediately after being disengaged.

FIG. 6 is a sectional view illustrating the clutch C4 according to the embodiment immediately after being disengaged. As illustrated in FIG. 6, when working oil (an engagement hydraulic pressure) is drawn from the engagement oil chamber 460 by the hydraulic control device 60, the piston 440 is moved in the direction away from the friction plates 420 and the separator plates 430 in the axial direction of the automatic transmission 25.

When the piston 440 is moved, a pressing force that brings the plurality of friction plates 420 and the plurality of separator plates 430 into contact with each other is canceled. Consequently, the friction plates 420 and the separator plates 430 are movable in the axial direction of the automatic transmission 25.

When the friction plates 420 and the separator plates 430 are movable, working oil stored in the flow paths 407 is supplied from the supply oil holes 408, which open in the flow paths 407, to spaces between the friction plates 420 and the separator plates 430 which are adjacent to each other. When the working oil is supplied to the spaces between the friction plates 420 and the separator plates 430, the working oil cools the friction plates 420 and the separator plates 430.

As discussed above, the number of the first supply oil holes 408a is larger than the respective numbers of the second to fourth supply oil holes 408b to 408d. Therefore, the amount of working oil flowing out from the first supply oil holes 408a is larger than the respective amounts of working oil flowing out from the second to fourth supply oil holes 408b to 408d.

The first supply oil holes 408a are provided at a position that is the closest to the piston 440 in the axial direction of the clutch hub 400 (automatic transmission 25). Therefore, working oil that has flowed out from the first supply oil holes 408a is supplied to a space between the separator plate 430 that is the closest to the piston 440 in the axial direction of the automatic transmission 25 and the friction plate 420 that is adjacent to the separator plate 430.

Working oil that has flowed out from the first supply oil holes 408a presses the separator plate 430 that is the closest to the piston 440 in the axial direction of the automatic transmission 25 toward the pressing portion 442 of the piston 440 which has been moved. Consequently, the separator plate 430 that is the closest to the piston 440 in the axial direction of the automatic transmission 25 is moved to a position at which the separator plate 430 contacts the pressing portion 442 or a position at which the separator plate 430 is close to the pressing portion 442. In other words, the distance between the separator plate 430 that is the closest to the piston 440 in the axial direction of the automatic transmission 25 and the backing plate 450 is increased.

Figure 7:
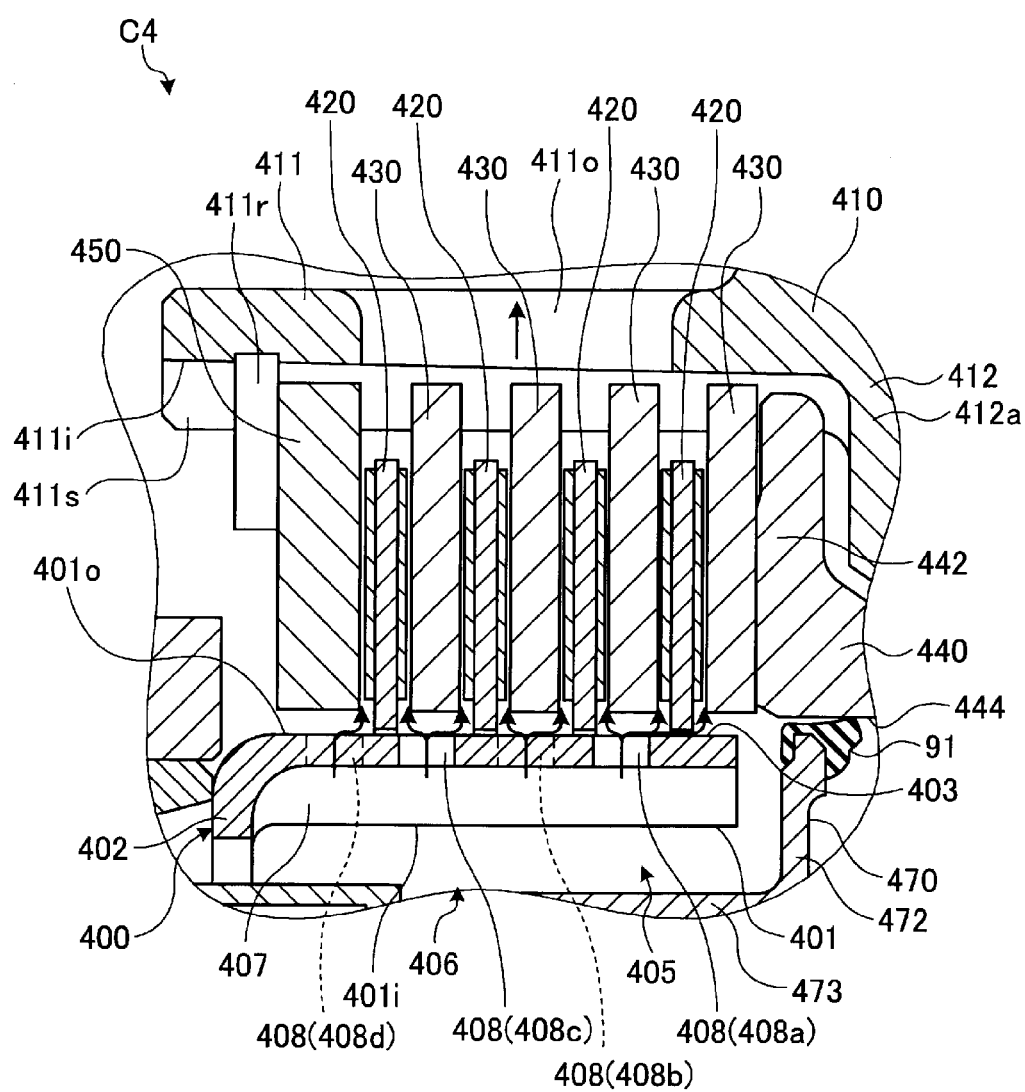
FIG. 7 is a sectional view illustrating the clutch according to the embodiment in a disengaged state.

FIG. 7 is a sectional view illustrating the clutch C4 according to the embodiment in a disengaged state. As illustrated in FIG. 7, when the distance between the separator plate 430 that is the closest to the piston 440 in the axial direction of the automatic transmission 25 and the backing plate 450 is increased, the other separator plates 430 and the friction plates 420 are easily movable. Therefore, working oil supplied from the plurality of supply oil holes 408 presses the other separator plates 430 and the friction plates 420 so as to increase the distances between the separator plates 430 and the friction plates 420. Consequently, the plurality of friction plates 420 and the plurality of separator plates 430 are spaced from each other. Hereinafter, a state in which the friction plates 420 and the separator plates 430 are spaced from each other will be referred to as a "released state".

Working oil supplied to the spaces between the plurality of friction plates 420 and the plurality of separator plates 430 is discharged from a discharge hole 4110 provided in the outer tubular portion 411 of the clutch drum 410. The working oil which has been discharged from the discharge hole 4110 is supplied from the clutch hub of the clutch C3 to spaces between the friction plates and the separator plates of the clutch C3.

After working oil stored in the flow paths 407 flows out from the supply oil holes 408, meanwhile, the working oil is supplied from the supply oil path 406 to the cooling oil chamber 405. The working oil flows through the plurality of flow paths 407 to be supplied to the plurality of supply oil holes 408.

As illustrated in FIG. 5, the first supply oil hole 408a which is provided in the first and fifth splines 403a and 403e is provided side by side with the third supply oil hole 408c in the axial direction of the clutch hub 400. The third supply oil holes 408c are provided closer to the supply oil path 406 than the first supply oil holes 408a in the axial direction of the clutch hub 400. Therefore, working oil flowing through the flow paths 407 corresponding to the first and fifth splines 403a, 403e is first supplied to the third supply oil holes 408c, and is not easily supplied to the first supply oil holes 408a. Thus, the amount of working oil flowing out from the first supply oil holes 408a which are provided in the first and fifth splines 403a, 403e is much smaller than the amount of working oil flowing out from the third supply oil holes 408c.

Meanwhile, the first supply oil hole 408a which is provided in the third and seventh splines 403c, 403g is provided singly in the axial direction of the clutch hub 400. Therefore, working oil flowing through the flow paths 407 corresponding to the third and seventh splines 403c, 403g is supplied to the first supply oil holes 408a.

Since the amount of working oil flowing out from the first supply oil holes 408*a* which are provided in the first and fifth splines 403*a*, 403*e* is small as described above, the number of the first supply oil holes 408*a* from which working oil flows out in the released state is substantially ten. That is, the number of the first supply oil holes 408*a* from which working oil flows out is substantially the same as the number of the third supply oil holes 408*c*.

The second supply oil hole 408*b* which is provided in the second, fourth, and sixth splines 403*b*, 403*d*, 403*f* is provided singly in the axial direction of the clutch hub 400. Therefore, working oil flowing through the flow paths 407 corresponding to the second, fourth, and sixth splines 403*b*, 403*d*, 403*f* is supplied to the second supply oil holes 408*b*.

The fourth supply oil hole 408*d* which is provided in the eighth splines 403*h* is provided singly in the axial direction of the clutch hub 400. Therefore, working oil flowing through the flow paths 407 corresponding to the eighth splines 408*d* is supplied to the fourth supply oil holes 408*d*.

As has been described above, in the released state, working oil flowing through the flow paths 407 corresponding to the third and seventh splines 403*c*, 403*g* is substantially supplied to ten first supply oil holes 408*a*. As indicated by the arrows in FIG. 7, the working oil is supplied from the ten first supply oil holes 408*a* to spaces between the separator plates 430 and the friction plates 420 which are close to the piston 440.

Working oil flowing through the flow paths 407 corresponding to the second, fourth, and sixth splines 403*b*, 403*d*, 403*f* is supplied to the 15 second supply oil holes 408*b*. The working oil is supplied from the 15 second supply oil holes 408*b* to a space between the friction plate 420 and the separator plate 430 which are positioned around the center in the axial direction of the automatic transmission 25, of the plurality of friction plates 420 and the plurality of separator plates 430, for example.

The number of the second supply holes 408*b* is larger than the respective numbers of the first, third, and fourth supply holes 408*a*, 408*b*, 408*d*. Therefore, the amount of working oil flowing out from the second supply holes 408*b* is larger than the respective amounts of working oil flowing out from the first, third, and fourth supply holes 408*a*, 408*b*, 408*d*.

The friction plate 420 and the separator plate 430 which are positioned around the center in the axial direction of the automatic transmission 25, of the plurality of friction plates 420 and the plurality of separator plates 430, tend to be at a higher temperature than the other friction plates 420 and separator plates 430. Since the amount of working oil flowing out from the second supply holes 408*b* is relatively large, however, the friction plate 420 and the separator plate 430 which are positioned around the center are sufficiently cooled by the working oil. The number of the second supply holes 408*b* may be the same as the number of the third supply holes 408*c*.

Working oil flowing through the flow paths 407 corresponding to the first and fifth splines 403*a*, 403*e* is supplied to the ten third supply oil holes 408*c*. The working oil is supplied from the ten third supply oil holes 408*c* to a space between the separator plate 430 and the friction plate 420 on the first and second planetary gear mechanisms 30, 35 side (left side in FIG. 7), for example.

Working oil flowing through the flow paths 407 corresponding to the eighth splines 403*h* is supplied to the fourth supply oil holes 408*d*. The supplied oil is supplied from the five fourth supply oil holes 408*d* to a space between the friction plate 420 that is the closest to the first and the second planetary gear mechanisms 30, 35 side and the backing plate 450, for example.

Working oil supplied from the fourth supply oil holes 408*d* cools one surface of the friction plate 420 and one surface of the backing plate 450. Therefore, the friction plate 420 and the backing plate 450 are sufficiently cooled even if the number of the fourth supply oil holes 408*d* is smaller than the respective numbers of the first to third supply oil holes 408*a* to 408*c* which supply working oil for cooling a plurality of surfaces of the friction plates 420 and the separator plates 430.

Since supplied oil is supplied from the first to fourth supply oil holes 408*a* to 408*d* to the spaces between the plurality of friction plates 420 and the plurality of separator plates 430 as described above, the respective distances between the plurality of friction plates 420 and the plurality of separator plates 430 are roughly uniform.

In the automatic transmission 25 according to the embodiment described above, the plurality of supply oil holes 408 of the clutch hub 400 have the plurality of first supply oil holes 408*a* which are the closest to the piston 440 in the axial direction, and the plurality of third supply oil holes 408*c* which are farther from the piston 440 than the first supply oil holes 408*a* in the axial direction, which are closer to the supply oil path 406 than the first supply oil holes 408*a*, and the number of which is smaller than the number of the first supply oil holes 408*a*. At least one of the plurality of first supply oil holes 408*a* is provided singly in the axial direction, while at least one of the plurality of first supply oil holes 408*a* and the third supply oil holes 408*c* are provided side by side in the axial direction.

In a state in which the plurality of friction plates 420 and the plurality of separator plates 430 are brought into contact (engagement) with each other by the piston 440, the spaces between the friction plates 420 and the separator plates 430 from the supply oil holes 408 are blocked, and therefore working oil is not supplied from the supply oil holes 408 but stored in the inner peripheral surface 401*i* (flow paths 407) of the clutch hub 400.

When the piston 440 is moved away from the friction plates 420 and the separator plates 430, the friction plates 420 and the separator plates 430 are movable, and therefore working oil is supplied from the plurality of supply oil holes 408 to the spaces between the friction plates 420 and the separator plates 430. In this event, the working oil is supplied from the plurality of first supply oil holes 408*a* at a position that is the closest to the piston 440 in the axial direction. In addition, working oil is supplied from the third supply oil holes 408*c* at a position that is farther from the piston 440 than the first supply oil holes 408*a*.

Since the number of the third supply oil holes 408*c* is smaller than the number of the first supply oil holes 408*a*, the amount of working oil supplied from the first supply oil holes 408*a* to the space between the separator plate 430 that are the closest to the piston 440 and the friction plate 420 is larger than the amount of working oil supplied from the third supply oil holes 408*c* to the space between the separator plate 430 and the friction plate 420. Therefore, a force with which working oil supplied from the first supply oil holes 408*a* presses the separator plate 430 that is the closest to the piston 440 is stronger than a force with which working oil supplied from the third supply oil holes 408*c* presses the separator plate 430. Thus, the separator plate 430 that is the closest to the piston 440 is pressed toward the piston 440, which has been spaced therefrom, by working oil supplied from the first supply oil holes 408*a* with a force that is larger than the force with which working oil supplied from the third supply oil holes 408c presses the separator plate 430. That is, the distance (total pack clearance) between the separator plate 430 that is the closest to the piston 440 and the backing plate 450 which is positioned on the opposite side of the separator plate 430 etc. is increased significantly. Consequently, the plurality of separator plates 430 and the plurality of friction plates 420 can be moved away from each other quickly by working oil supplied from the plurality of supply oil holes 408.

In a state (released state) in which the piston 440 has been maximally moved in the direction away from the friction plates 420 and the separator plates 430, working oil is supplied from the plurality of supply oil holes 408 to the spaces between the friction plates 420 and the separator plates 430. At least one of the first supply oil holes 408a and the third supply oil holes 408c are provided side by side in the axial direction. Therefore, working oil supplied from the supply oil path 406 enters the third supply oil holes 408c which are closer to the supply oil path 406 in the axial direction, and does not easily enter the first supply oil holes 408a which are arranged side by side with the third supply oil holes 408c in the axial direction. On the other hand, working oil easily enters the first supply oil holes 408a which are provided singly in the axial direction. Therefore, the number of the first supply oil holes 408a which supply working oil to the space between the friction plate 420 and the separator plate 430 is reduced, which makes the amount of working oil supplied from the first supply oil holes 408a to the space between the friction plate 420 and the separator plate 430 and the amount of working oil supplied from the third supply oil holes 408c, the number of which is smaller than the number of the first supply oil holes 408a, to the space between the friction plate 420 and the separator plate 430 closer to each other. Consequently, it is possible to make the distances (pack clearances) between the plurality of friction plates 420 and the plurality of separator plates 430 more uniform.

The plurality of supply oil holes 408 connect between the flow paths 407, which are provided on the first inner peripheral surface 401i of the clutch hub 400, and the splines 403. Therefore, working oil supplied from the supply oil path 406 flows in the axial direction through the flow paths 407. Consequently, working oil in the flow paths 407 in which the first and third supply oil holes 408a, 408c open reliably enters the third supply oil holes 408c, and does not easily enter the first supply oil holes 408a. Thus, the number of the first supply oil holes 408a which supply working oil to the space between the friction plate 420 and the separator plate 430 is reduced more reliably, which makes it possible to make the amount of working oil supplied from the first supply oil holes 408a to the space between the friction plate 420 and the separator plate 430 and the amount of working oil supplied from the third supply oil holes 408c, the number of which is smaller than the number of the first supply oil holes 408a, to the space between the friction plate 420 and the separator plate 430 closer to each other.

The supply oil holes 408 have at least one second supply oil holes 408b which is farther from the piston 440 than the first supply oil holes 408a in the axial direction, which is closer to the supply oil path 406 than the first supply oil holes 408a, and which is provided singly. Thus, working oil is supplied to the space between the friction plate 420 and the separator plate 430 also from the second supply oil holes 408b which are provided singly in the axial direction. Thus, even in the case where there are a large number of friction plates 420 and separator plates 430, working oil is supplied more efficiently to the space between the friction plate 420 and the separator plate 430, which makes it possible to make the distances (pack clearances) between the plurality of friction plates 420 and the plurality of separator plates 430 more uniform.

The second supply oil holes 408b are provided between the first supply oil holes 408a and the third supply oil holes 408c in the axial direction. Consequently, the distance between the first supply oil hole 408a and the third supply oil hole 408c which are provided side by side in the axial direction is increased, which reduces the possibility that the strength of the clutch hub 400 is lowered.

In the embodiment described above, the supply oil holes 408 connect between the top surfaces of the splines 403 and the flow paths 407. However, the supply oil holes 408 are not limited thereto, and may connect between the outer peripheral surface 401o of the tubular portion 401 (bottom surfaces of the splines 403) and the inner peripheral surface 401i of the tubular portion 401, for example.

The speed change device according to the embodiment includes a clutch hub, a clutch drum, a plurality of inner friction plates, a plurality of outer friction plates, and a piston. The clutch hub has a first outer peripheral surface provided with first splines that extend in an axial direction and a first inner peripheral surface that is positioned on the opposite side of the first outer peripheral surface and that faces a supply portion for working oil. The clutch hub is provided with a plurality of oil holes that connect between the first inner peripheral surface and the first outer peripheral surface. The clutch drum houses at least a part of the clutch hub such that the clutch drum is rotatable with respect to the clutch hub, and has a second inner peripheral surface provided with second splines that extend in the axial direction. The inner friction plates are spline-fitted with the first splines. The outer friction plates are spline-fitted with the second splines, and disposed alternately with the plurality of inner friction plates in the axial direction. The piston presses the plurality of inner friction plates and the outer friction plates. The plurality of oil holes have a plurality of first oil holes that are the closest to the piston in the axial direction and that are disposed side by side in a circumferential direction, and a plurality of different oil holes that are farther from the piston than the plurality of first oil holes in the axial direction. The plurality of oil holes enable the working oil to be supplied to spaces between the plurality of inner friction plates and the outer friction plates. The number of the plurality of different oil holes of the plurality of different oil holes is smaller than the number of the plurality of first oil holes, the plurality of different oil holes being disposed side by side in the circumferential direction at a position that is farther from the piston than the plurality of first oil holes in the axial direction.

With this configuration, the plurality of oil holes of the clutch hub have a plurality of first oil holes that are the closest to the piston in the axial direction and that are disposed side by side in the circumferential direction, and a plurality of different oil holes that are farther from the piston than the plurality of first oil holes in the axial direction. The number of the plurality of different oil holes of the plurality of different oil holes is smaller than the number of the plurality of first oil holes, the plurality of different oil holes being disposed side by side in the circumferential direction at a position that is farther from the piston than the plurality of first oil holes in the axial direction.

In a state in which the plurality of inner friction plates and the plurality of outer friction plates are brought into contact (engagement) with each other by the piston, the spaces between the inner friction plates and the outer friction plates from the oil holes are blocked, and therefore working oil is not supplied from the oil holes but stored in the inner peripheral surface of the clutch hub.

When the piston is moved away from the inner friction plates and the outer friction plates, the inner friction plates and the outer friction plates are movable, and therefore working oil is supplied from the plurality of oil holes to the spaces between the inner friction plates and the outer friction plates. In this event, the working oil is supplied from the plurality of first oil holes, which are disposed side by side in the circumferential direction, at a position that is the closest to the piston in the axial direction. In addition, the working oil is supplied from the different oil holes, which are disposed side by side in the circumferential direction, at a position that is farther from the piston than the first oil holes.

Since the number of the different oil holes is smaller than the number of the first oil holes, the amount of working oil supplied from the first oil holes to the space between the outer friction plate and the inner friction plate that are the closest to the piston is larger than the amount of working oil supplied from the different oil holes to the space between the outer friction plate and the inner friction plate. Therefore, a force with which working oil supplied from the first oil holes presses the outer friction plate or the inner friction plate (outer friction plate or the like) that is the closest to the piston is stronger than a force with which working oil supplied from the different oil holes presses the outer friction plate or the like. Thus, the outer friction plate or the like that is the closest to the piston is pressed toward the piston, which has been spaced from the outer friction plate and the inner friction plate, by working oil supplied from the first oil holes with a force that is larger than the force with which working oil supplied from the different oil holes presses the outer friction plate or the like. That is, the distance (total pack clearance) between the outer friction plate or the like that is the closest to the piston and the outer friction plate or the like which is positioned on the opposite side of the above outer friction plate or the like is increased significantly. Consequently, the plurality of outer friction plates and the plurality of inner friction plates can be moved away from each other quickly by working oil supplied from the plurality of oil holes.

As has been described above, when releasing the outer friction plate and the inner friction plate from an engaged state, the largest amount of lubricating oil can be supplied to the outer friction plate and the inner friction plate that are the closest to the piston, which allows the outer friction plate and the inner friction plate that are the closest to the piston to be quickly separated from the other outer friction plates and inner friction plates to release the spaces (pack) between the outer friction plates and the inner friction plates. Thus, a drag loss can be reduced, and the efficiency (fuel efficiency) of the speed change device can be improved.

In the embodiment, preferably, the plurality of different oil holes have one or more second oil holes that are closer to the supply portion than the first oil holes in the axial direction and that are disposed side by side in the circumferential direction, and the number of the second oil holes is smaller than the number of the first oil holes; at least one of the plurality of first oil holes is provided singly in the axial direction; and at least one of the plurality of first oil holes and the second oil holes are provided side by side in the axial direction.

With this configuration, the plurality of oil holes of the clutch hub have a plurality of first oil holes that are the closest to the piston in the axial direction, and second oil holes that are farther from the piston than the plurality of first oil holes in the axial direction, that are closer to the supply portion for working oil than the first oil holes, and the number of the second oil holes is smaller than the number of the first oil holes. At least one of the plurality of first oil holes is provided singly in the axial direction, while at least one of the plurality of first oil holes and the second oil holes are provided side by side in the axial direction.

In a state (released state) in which the piston is maximally moved away from the inner friction plates and the outer friction plates, working oil is supplied from the plurality of oil holes to the spaces between the inner friction plates and the outer friction plates. At least one of the first oil holes and the second oil holes are provided side by side in the axial direction. Therefore, working oil supplied from the supply portion enters the second oil holes which are closer to the supply portion in the axial direction, and does not easily enter the first oil holes which are arranged side by side with the second oil holes in the axial direction. On the other hand, working oil easily enters the first oil holes which are provided singly in the axial direction. Therefore, the number of the first oil holes which supply working oil to the space between the inner friction plate and the outer friction plate is reduced, which makes the amount of working oil supplied from the first oil holes to the space between the inner friction plate and the outer friction plate and the amount of working oil supplied from the second oil holes, the number of which is smaller than the number of the first oil holes, to the space between the inner friction plate and the outer friction plate closer to each other. Consequently, it is possible to make the distances (pack clearances) between the plurality of inner friction plates and the plurality of outer friction plates more uniform. Thus, a drag loss can be reduced, and the efficiency (fuel efficiency) of the speed change device can be improved.

As described above, at least one of the first oil holes is provided singly in the axial direction, and not provided side by side with the second oil holes in the axial direction. Therefore, working oil can be reliably supplied to the first oil holes which are the farthest from the supply portion. Furthermore, at least one of the plurality of first oil holes and the second oil hole are provided side by side in the axial direction. Therefore, when the piston presses the outer friction plate and the inner friction plate and working oil is not easily discharged, working oil which has not been discharged from the second oil holes is supplied to the first oil holes. Therefore, a larger amount of working oil can be supplied to the first oil holes. As a result, much working oil is discharged from the first oil holes when operation to return the piston in order to disengage a clutch is started. Therefore, working oil can be supplied to a space between the outer friction plate or the inner friction plate that is the closest to the piston and the outer friction plate or the inner friction plate which is adjacent thereto. This allows the outer friction plate and the inner friction plate to be moved away from each other quickly.

In the embodiment, preferably, the first inner peripheral surface of the clutch hub is provided with a plurality of grooves that are provided at positions corresponding to the first splines and that extend in the axial direction; and the plurality of oil holes connect between the grooves and the first splines. In this configuration, the plurality of oil holes connect between the grooves, which are provided on the first inner peripheral surface of the clutch hub, and the first splines. Therefore, working oil supplied from the supply portion flows in the axial direction through the grooves. Consequently, working oil in the grooves in which the first and second oil holes open reliably enters the second oil holes, and does not easily enter the first oil holes. Thus, the number of the first oil holes which supply working oil to the space between the inner friction plate and the outer friction plate is reduced reliably, which makes it possible to make the amount of working oil supplied from the first oil holes to the space between the inner friction plate and the outer friction plate and the amount of working oil supplied from the second oil holes, the number of which is smaller than the number of the first oil holes, to the space between the inner friction plate and the outer friction plate closer to each other.

In the embodiment, preferably, the plurality of different oil holes have one or more third oil holes that are closer to the supply portion than the first oil holes in the axial direction, that are provided singly in the axial direction, and that are disposed side by side in the circumferential direction. In this configuration, the oil holes have one or more third oil holes which are farther from the piston than the first oil holes in the axial direction, which are closer to the supply portion than the first oil holes, and which are provided singly. Thus, working oil is supplied to the space between the inner friction plate and the outer friction plate also from the third oil holes which are provided singly in the axial direction. Thus, even in the case where there are a large number of inner friction plates and outer friction plates, working oil is supplied more efficiently to the space between the inner friction plate and the outer friction plate, which makes it possible to make the distances (pack clearances) between the plurality of inner friction plates and the plurality of outer friction plates more uniform.

In the embodiment, preferably, the third oil holes are provided between the first oil holes and the second oil holes in the axial direction, and the number of the third oil holes is smaller than the number of the first oil holes and larger than the number of the second oil holes. In this configuration, the third oil holes are provided between the first oil holes and the second oil holes in the axial direction. Consequently, the distance between the first oil hole and the second oil hole which are provided side by side in the axial direction is increased, which reduces the possibility that the strength of the clutch hub is lowered.

In the embodiment, preferably, the plurality of different oil holes have one or more fourth oil holes that are the farthest from the piston in the axial direction, that are farther from the piston than the inner friction plate of the plurality of inner friction plates, the inner friction plate being the farthest from the piston in the axial direction, and that are disposed side by side in the circumferential direction; the first oil holes, the second oil holes, and the third oil holes are positioned between the inner friction plates which are adjacent to each other in the axial direction; and the number of the fourth oil holes is smaller than the number of the second oil holes. In this configuration, working oil supplied from the first to third oil holes is supplied to a space between one outer friction plate and two inner friction plates, and separates the two inner friction plates from the one outer friction plate. Meanwhile, working oil supplied from the fourth oil holes is supplied to a space between the inner friction plate and the outer friction plate that are the farthest from the piston, and separates the one inner friction plate from the one outer friction plate. Thus, the number of the fourth oil holes which supply working oil for pressing one inner friction plate is smaller than the number of the second oil holes which supply working oil for pressing two inner friction plates. Therefore, the respective amounts of working oil for pressing one inner friction plate are evener, and the respective distances between the plurality of outer friction plates and the plurality of inner friction plates are roughly uniform.

In the embodiment, preferably, the plurality of different oil holes have one or more fourth oil holes that are the farthest from the piston in the axial direction, that face an inner peripheral end surface of the outer friction plate of the plurality of outer friction plates, the outer friction plate being the farthest from the piston in the axial direction, that are disposed singly in the axial direction, and that are disposed side by side in the circumferential direction; and the number of the fourth oil holes is smaller than the number of the second oil holes. In this configuration, working oil is supplied from the fourth oil holes also to a space between the outer friction plate and the inner friction plate that are the farthest from the piston. Thus, the distance between the outer friction plate and the inner friction plate that are the farthest from the piston is increased.

The embodiment of the present disclosure discussed above does not limit the scope of the disclosure, and is merely an example that is included in the scope of the disclosure. A certain embodiment of the present disclosure may be a version of the embodiment discussed above in which at least one of its specific usage, structure, shape, function, and effect have been modified, omitted, and added without departing from the scope and spirit of the disclosure, for example.

The invention claimed is:

1. A speed change device comprising:
    a clutch hub that has a first outer peripheral surface provided with first splines that extend in an axial direction and a first inner peripheral surface that is positioned on an opposite side of the first outer peripheral surface and that faces a supply portion for working oil, the clutch hub being provided with a plurality of oil holes that connect between the first inner peripheral surface and the first outer peripheral surface;
    a clutch drum that houses at least a part of the clutch hub such that the clutch drum is rotatable with respect to the clutch hub and that has a second inner peripheral surface provided with second splines that extend in the axial direction;
    a plurality of inner friction plates spline-fitted with the first splines;
    a plurality of outer friction plates spline-fitted with the second splines and disposed alternately with the plurality of inner friction plates in the axial direction; and
    a piston that presses the plurality of inner friction plates and the outer friction plates in the axial direction, wherein:
    the plurality of oil holes includes all oil holes that are provided in the clutch hub,
    the plurality of oil holes have a plurality of first oil holes that are closest to the piston among the plurality of oil holes provided in the clutch hub in the axial direction and that are disposed side by side in a circumferential direction, and a plurality of different oil holes that are farther from the piston than the plurality of first oil holes in the axial direction, the plurality of oil holes enabling the working oil to be supplied to spaces between the plurality of inner friction plates and the outer friction plates; and
    a number of the plurality of different oil holes is smaller than a number of the plurality of first oil holes, the plurality of different oil holes being disposed side by side in the circumferential direction at a position that is farther from the piston than the plurality of first oil holes in the axial direction.

2. The speed change device according to claim 1, wherein:
the plurality of different oil holes have one or more second oil holes that are closer to the supply portion than the first oil holes in the axial direction and that are disposed side by side in the circumferential direction, and a number of the second oil holes is smaller than the number of the first oil holes;
at least one of the plurality of first oil holes is provided singly in the axial direction; and
at least one of the plurality of first oil holes and the second oil holes are provided side by side in the axial direction.

3. The speed change device according to claim 2, wherein:
the first inner peripheral surface of the clutch hub is provided with a plurality of grooves that are provided at positions corresponding to the first splines and that extend in the axial direction; and
the plurality of oil holes connect between the grooves and the first splines.

4. The speed change device according to claim 3, wherein the plurality of different oil holes have one or more third oil holes that are closer to the supply portion than the first oil holes in the axial direction, that are provided singly in the axial direction, and that are disposed side by side in the circumferential direction.

5. The speed change device according to claim 4, wherein the third oil holes are provided between the first oil holes and the second oil holes in the axial direction, and a number of the third oil holes is smaller than the number of the first oil holes and larger than the number of the second oil holes.

6. The speed change device according to claim 5, wherein:
the plurality of different oil holes have one or more fourth oil holes that are farthest from the piston in the axial direction, that are farther from the piston than the inner friction plate of the plurality of inner friction plates, the inner friction plate being farthest from the piston in the axial direction, and that are disposed side by side in the circumferential direction;
the first oil holes, the second oil holes, and the third oil holes are positioned between the inner friction plates which are adjacent to each other in the axial direction; and
a number of the fourth oil holes is smaller than the number of the second oil holes.

7. The speed change device according to claim 5, wherein:
the plurality of different oil holes have one or more fourth oil holes that are farthest from the piston in the axial direction, that face an inner peripheral end surface of the outer friction plate of the plurality of outer friction plates, the outer friction plate being farthest from the piston in the axial direction, that are disposed singly in the axial direction, and that are disposed side by side in the circumferential direction; and
a number of the fourth oil holes is smaller than the number of the second oil holes.

8. The speed change device according to claim 1, wherein:
the clutch hub includes a tubular portion extending in the axial direction toward the piston and a wall extending inward from one end side opposite to the piston and coupled to another rotating member, and
the piston presses the plurality of inner friction plates and the outer friction plates in the axial direction from the other end side opposite to the one end side toward the one end side.

9. The speed change device according to claim 8, wherein:
an inner surface of the tubular portion is smooth from the one end side to the other end side that is opposite in the axial direction to the one end side of the clutch hub.

10. The speed change device according to claim 1, wherein:
the first oil holes are positioned on the opposite side, in the axial direction, of either one of the plurality of inner friction plates and the outer friction plates that is the closest to the piston, from the piston, and the number of the first oil holes is the largest.

* * * * *